2,863,934
Patented Dec. 9, 1958

2,863,934

DEVICE FOR CONDUCTING HIGH-FREQUENCY CURRENT INTO A VACUUM TANK

Chester A. Tudbury, Cleveland, Ohio, assignor to The Ohio Crankshaft Company, Cleveland, Ohio, a corporation of Ohio Application May 9, 1956, Serial No. 583,857

7 Claims. (Cl. 174—18)

The present invention relates to a device for conducting high-frequency current into a vacuum tank and, in particular, to an arrangement wherein fluid cooled rectangular shaped bus bars extend through and are vacuum sealed in a wall of a vacuum tank to conduct high-freqency current into the tank.

Manufacturers of vacuum type furnaces have utilized various types of leads for conducting high-frequency current into the furnace to heat the contents thereof. One of these types is the ordinary circular wire leads. Another of the types of leads which might be used for conducting high-frequency current is the coaxial type cable, which, like all leads, must be fluid cooled, and vacuum sealed in the wall at the entrance to the furnace. The coaxial type cable is electrically practical but presents a mechanical problem of providing an adequate vacuum seal between the cable and the wall of the tank at the point of entrance and in not exposing large areas of opposed electrical polarity across relatively short coolant fluid paths.

It is well known that the current in high-frequency leads is concentrated by skin effect and that the high frequency current is concentrated in the adjacent portions of leads in close proximity with each other. This is generally termed the proximity effect since the currents are concentrated substantially in only those portions of conductors of opposite polarity which are closest to and facing each other. When conductors or leads having small surface areas in proximity or in side-by-side relationship are used, the smaller or narrow surface areas of the conductors which face each other seriously limit the high current carrying capacity of the conductors because of this proximity effect. Practice in the industry has established the fact that best high-frequency current conductivity is obtained when a pair of conductors transmitting the high-frequency current have large surface areas in close proximity with each other.

Flat conductors, leads or bus bars with wide areas facing each other and as close together as good insulating practice will permit provide an efficient way of transmitting high-frequency current. Ordinary round wires or leads do not provide the wide areas facing each other. The present invention therefore contemplates the utilization of these flat bus bars so that efficient transmitting of high-frequency current into a vacuum tank or furnace is obtained while providing adequate cooling of the conductors and adequate vacuum seal where they enter the tank wall.

In accordance with the present invention, the conductors may take form in rectangular cross-section bus bars having small thickness compared to their relatively large surface areas which are placed in close proximity with each other to provide good current conductivity. However, it has, up to now, been impractical to provide adequate vacuum seal around these rectangular cross-section shaped conductors at the place where they pass through the wall.

The present invention contemplates means for providing adequate seal between the rectangular shaped bus bars and the supporting wall portions of the tank. In accordance with the invention, this seal may include means for increasing the mechanical thickness of the bus bar and providing rounded corners on the means or conductor where it passes through the wall to accommodate and cooperate with vacuum seal means such as O-rings or the like.

Since these conductorsm ay be subjected to intense heats and since they have internal $I^2R$ losses due to the conducting of high-frequency current, it is necessary that the conductors be adequately cooled by coolant fluids such as water passing through the conductors.

The present invention contemplates a structure which provides conductors of low resistance having large, preferably flat or parallel, surface areas in close proximity with each other and means for cooling the conductors.

The present invention contemplates a pair of somewhat rectangular cross-sectional shaped bus bars and means for providing an adequate vacuum seal around each bar.

In accordance with the invention, there is provided a vacuum tank wall portion having conductor holes defined by inside surfaces complementary with the surfaces of the leads or conductors and a peripheral groove in said inside surface to hold an O-ring or similar seal ring in engagement with the surface of the conductor.

Each conductor is cooled by providing it with passages, through which a fluid coolant such as water may be conducted, which are completely within the material of the conductor in that portion of the conductor extending through the wall portion of the tank. This part of the conductor may easily be constructed from a relatively flat bus bar and a member having a pair of parallel grooves. The member is brazed to the bus bar so that the bus bar covers the grooves thus forming the coolant passages. The bus bar and member are brazed together as a unitary structure which may be mechanically secured to the wall of the tank by any suitable means such as providing the member with a flange and bolting this flange to the wall of the tank. Ordinary conduit tubes may be brazed to the bus bar and each end to the member and in continuous passage with the grooves to provide a continuous passage for the flow of coolant.

One of the problems encountered with prior devices was that of providing coolant conduits inside the furnace or vacuum tank. Generally these conduits included dangerous hoses or fittings. If one of these connections or fittings sprung a leak, the fluid coolant would contaminate the atmosphere internally of the vacuum tank and become a hazard to the operator of the furnace. The present invention eliminates these fittings inside the furnace and the hazards to the operator by utilizing the structure of conduit tubes brazed to the current conductor and passing coolant fluid through the conductor.

Induction melting furnaces utilizing high-frequency current should be provided with bus bars, leads, or conductors which have no restriction or joint, including a brazed joint, in the conductor and detrimental to the flow of current into the furnace. Such restrictions add to the resistance and thus the $I^2R$ heating losses. The present invention contemplates structure which provides an uninterrupted current circuit with no brazed joints or grooves in the current path.

One of the principal objects of the invention is to provide a device for conducting high-frequency current into a vacuum furnace wherein conductors having large surface areas facing each other and in close proximity are supported by a wall portion of the furnace and hermetically sealed therein to provide against vacuum leakage between the conductors and the wall.

Another object of the invention is to provide an improved O-ring type vacuum seal between a bus bar and the wall of the furnace at the point where the rectangular bus bar goes through the wall of the furnace.

Another object of the invention is to provide conductors for vacuum furnaces, each having a rectangular cross-section with coolant ducts internally of the conductors, and means for sealing the conductors in the wall of the furnace to prevent vacuum leakage from the furnace.

The invention may take physical form in certain parts and in an arrangement of parts, a preferred embodiment of which will be described in detail in this specification and illustrated in the accompanying drawings which are a part hereof and wherein:

Figure 1 is a cross-sectional view of a pair of conductors and a wall portion of the vacuum furnace illustrating that portion of the conductors extending through the wall and the means for vacuum sealing and cooling the conductors;

Figure 2 is a plan view taken along the line 2—2 of Figure 1.

In the drawings, the wall portion of the tank is illustrated as a plate 10 covering a hole 11 in the main wall 12 of the tank. Plate 10 is preferably constructed from an insulation material which will not conduct high-frequency current and may be secured to the main wall by bolts 13 or other suitable means. Supported by the cover plate 10 or wall portion is a pair of conductors 14 and 15. Since these conductors 14, 15 are substantially identical, only one of them will be described herein as far as the details of its construction are concerned. Conductors 14, 15 have relatively large flat surfaces facing each other and positioned as close together as good insulating practice will permit. The conductor 14 has opposite relatively flat side surfaces 16, 17, and opposite substantially circular edge surfaces 18, 19 merging with the side surfaces 16, 17. Side surface 16 is in close proximity with and facing its corresponding side surface of the other conductor 15. Conductor 14 is extended through and supported by the cover plate 10 by providing the cover plate 10 with an opening defined by an inside surface complementary with the side and edge surfaces 16, 17, 18, 19 of the conductor 14. A seal against vacuum leakage between the conductor 14 and the inside surface 20 is obtained by providing the inside surface 20 with an annular groove or recess 21 and inserting a seal ring or O-ring 22 in this recess. As is illustrated in Figure 1, the O-ring 22 engages the surfaces of the conductor 14 as well as the recess or groove 21 to prevent vacuum leakage.

Conductor 14 may be provided with fluid conduit passages 24 and 25 which are entirely internal of the conductor portion which passes through the cover plate 10.

The fluid passages are easily constructed in the conductor, while providing an uninterrupted current circuit by forming this part of the conductor from two parts. The first of these parts is an ordinary somewhat rectangular shaped bus bar 27 and the second of these parts is a current conducting member 28 having grooves on one face thereof which form the fluid passages 24, 25. The grooved side of the member 28 is brazed, welded or otherwise secured to the rectangular bus bar 27 so that the bus bar covers the grooves to form the fluid passages 24 and 25. The mechanical fastening between the conductor or member 28 and the cover plate 10 can be effected by providing the member 28 with a flange 29 and bolting this flange to the cover plate.

The fluid passage 24 may be extended along the conductor 14 or the bus bar internally of the tank, thereby continuing the passage 24 by brazing one end of the conduit 31 as illustrated to the member 28 and bus bar 27. Continuous and return flow of the fluid is obtained by similarly brazing the other end of this conduit 31 to the member 28 and bus bar 27 at the passage 25, or such other passage as may be desired.

It is noted that with this structure ordinary relatively thin bus bars 27 of rectangular cross-section and having wide surface areas are effectively used and sealed in the wall of the tank. The vacuum seal is effected by adding the member 28 to the bus bar and using an O-ring, or the like, in the vacuum seal. Addition of the member 28 to the bus bar 27 at that part of the bus bar going through the wall increases at least the thickness of the conductor so that rounded corners, such as edge surfaces 18 and 19, are provided for engagement with the O-ring, or any other seal which may be used between the conductor and supporting wall or plate.

This construction as described and illustrated herein provides an arrangement which is relatively easy to install in a vacuum furnace. The arrangement provides a pair of flat bus bars with wide areas facing each other and as close together as good insulating practice will permit, to provide the most efficient way of transmitting high-frequency current into the furnace.

This structure provides an uninterrupted current circuit with no brazed joints or grooves in the current path where they enter the wall of the furnace, and internal passages in the conductors for cooling them while eliminating the necessity of hazardous fittings internally of the furnace.

The present embodiment as described and illustrated herein provides structure capable of carrying out the objects and end results of the invention as herein set forth, and describes one method of accomplishing the objects and results set forth. It is understood that variations and modifications in the exact details of structure may be made without departing from the spirit and scope of the invention as hereinafter claimed.

Having thus described my invention, I claim:

1. A device for conducting high-frequency current into a vacuum tank comprising, a pair of high-frequency bus bars having large surface areas facing each other, a plate of insulation material supporting said bus bars, and a vacuum seal between each bus bar and said plate, each of said bus bars having opposite flat side surfaces and semi-circular edge surfaces merging with the side surfaces, said plate having a pair of internal wall surfaces, each complementary with the side and edge surfaces, and encircling its respective bus bar, each of said vacuum seals consisting of a groove in said internal wall surface and encircling its respective bus bar, and a vacuum sealing ring in said groove and engaging the bus bar surface to prevent vacuum leakage between the bus bar and the plate.

2. A device for conducting high-frequency current into a vacuum tank comprising, a pair of high-frequency bus bars having large surface areas facing each other, a plate of insulation material supporting said bus bars, and a vacuum seal between each bus bar and said plate, each of said bus bars having opposite flat side surfaces and semi-circular edge surfaces merging with the side surfaces, said plate having a pair of internal wall surfaces, each complementary with the side and edge surfaces, and encircling its respective bus bar, each of said vacuum seals consisting of a groove in said internal wall surface and encircling its respective bus bar, and a vacuum sealing ring in said groove and engaging the bus bar surface to prevent vacuum leakage between the bus bar and the plate, each of said bus bars having a pair of coolant fluid passages extending lengthwise thereof and transverse to the plate to conduct fluid through the bar on both sides of said plate.

3. A device for conducting high-frequency current through a tank wall comprising a pair of high-frequency conductors having large surface areas facing each other, a plate of insulation material supporting said conductors, and a vacuum seal between each conductor and said plate, each of said conductors consisting of a rectangular bus bar and a member brazed thereto and provided with a transverse flange adapted to be bolted to said plate, said bar and member forming a unitary structure having opposite flat side surfaces and semi-circular edge surfaces merging with the flat side surfaces, said plate having an internal wall surface complementary with the side and edge surfaces and encircling each conductor, each of said vacuum seals consisting of a groove in said internal wall surface and encircling its respective conductor and a vacuum sealing ring in said groove and engaging the conductor surface to prevent vacuum leakage between the conductor and the plate.

4. A device for conducting high-frequency current through a tank wall comprising a pair of high-frequency conductors having large surface areas facing each other, a plate of insulation material supporting said conductors, and a vacuum seal between each conductor and said plate, each of said conductors consisting of a rectangular bus bar and a member brazed thereto and provided with a transverse flange adapted to be bolted to said plate, said bar and member forming a unitary structure having opposite flat side surfaces and semi-circular edge surfaces merging with the flat side surfaces, said plate having an internal wall surface complementary with the side and edge surfaces and encircling each conductor, each of said vacuum seals consisting of a grove in said internal wall surface and encircling its respective conductor and a vacuum sealing ring in said groove and engaging the conductor surface to prevent vacuum leakage between the conductor and the plate, each of said members having a pair of coolant fluid grooves extending lengthwise thereof and covered by said bus bars to constitute fluid passages internally of and through the conductor.

5. A device for conducting high-frequency current into a vacuum tank comprising, a pair of high-frequency conductors having large surface areas facing each other, a plate of insulation material supporting said conductors and a vacuum seal between each conductor and said plate, each of said vacuum seals consisting of a groove in said plate and encircling its respective conductor and a vacuum sealing O-ring in said groove and engaging the conductor surface to prevent vacuum leakage between the conductor and the plate.

6. A device for conducting high-frequency current into a vacuum tank comprising, a pair of high-frequency conductors having large surface areas facing each other, a plate of insulation material supporting said conductors and a vacuum seal between each conductor and said plate, each of said vacuum seals consisting of a groove in said plate and encircling its respective conductor and a vacuum sealing O-ring in said groove and engaging the conductor surface to prevent vacuum leakage between the conductor and the plate, each of said conductors having internal coolant fluid passages extending lengthwise thereof and transverse to the plate whereby coolant fluid may be conducted through the conductors on both sides of the plate.

7. A device for conducting high-frequency current through a tank wall comprising a pair of high-frequency conductors having large surface areas facing each other, a plate of insulation material supporting said conductors, and a vacuum seal between each conductor and said plate, each of said conductors consisting of a rectangular bus bar and a member brazed thereto and forming a unitary structure having opposite flat side surfaces and semi-circular edge surfaces merging with the flat side surfaces, said plate having an internal wall surface complementary with the side and edge surfaces and encircling each conductor, each of said vacuum seals consisting of a groove in said internal wall surface and encircling its respective conductor and a vacuum sealing ring in said grove and engaging the conductor surface to prevent vacuum leakage between the conductor and the plate, each of said members having at least a coolant fluid groove extending lengthwise thereof and covered by said bus bars to constitute fluid passages internally of and through the conductor.

References Cited in the file of this patent

UNITED STATES PATENTS

| | | |
|---|---|---|
| 247,084 | Maxim | Sept. 13, 1881 |
| 2,084,580 | Frank | June 22, 1937 |
| 2,438,993 | De Boer | Mar. 20, 1944 |
| 2,440,668 | Tarbox | Apr. 27, 1948 |

FOREIGN PATENTS

| | | |
|---|---|---|
| 25,613 | France (1st addition to No. 540,916) | Apr. 21, 1923 |
| 474,238 | Great Britain | Oct. 27, 1937 |

OTHER REFERENCES

Publication: AIEE Technical Paper 52–68, December 1951, "Bus Bar Design for High-Frequency Induction Heating" by Williamson, pages 4 and 9.